United States Patent
Nagao

(10) Patent No.: US 10,600,407 B2
(45) Date of Patent: Mar. 24, 2020

(54) GENERATION DEVICE, RECOGNITION SYSTEM, AND GENERATION METHOD FOR GENERATING FINITE STATE TRANSDUCER

(71) Applicant: KABUSHIKI KAISHA TOSHIBA, Tokyo (JP)

(72) Inventor: Manabu Nagao, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 15/428,648

(22) Filed: Feb. 9, 2017

(65) Prior Publication Data
US 2018/0025723 A1   Jan. 25, 2018

(30) Foreign Application Priority Data
Jul. 20, 2016   (JP) .................................. 2016-142629

(51) Int. Cl.
*G10L 15/14* (2006.01)
*G10L 15/193* (2013.01)
(Continued)

(52) U.S. Cl.
CPC ............ *G10L 15/193* (2013.01); *G10L 15/02* (2013.01); *G10L 15/1807* (2013.01);
(Continued)

(58) Field of Classification Search
None
See application file for complete search history.

(56) References Cited

U.S. PATENT DOCUMENTS

| 4,741,036 A | 4/1988 | Bahl et al. |
| 5,729,656 A | 3/1998 | Nahamoo et al. |
| (Continued) | | |

FOREIGN PATENT DOCUMENTS

| JP | 3-72989 | 11/1991 |
| JP | 2000-267691 | 9/2000 |
| (Continued) | | |

OTHER PUBLICATIONS

Martinez, F., et al., "Towards Speech Rate Independence in Large Vocabulary Continuous Speech Recoonition", Proc. of Acoustics, Speech and Signal Processing, vol. 2, IEEE pp. 725-728 (1998).
(Continued)

*Primary Examiner* — Richard Z Zhu
(74) *Attorney, Agent, or Firm* — Finnegan, Henderson, Farabow, Garrett & Dunner, L.L.P.

(57) ABSTRACT

A generation device includes a receiving unit and a generating unit. The receiving unit receives a model representing correspondence between one or more phonetic symbols and one or more words. The generating unit generates a first finite state transducer based on the model, the first finite state transducer at least including, as outgoing transitions from a first state representing transition destination of a first transition which has a first phonetic symbol of a predetermined type as input symbol, a second transition that has a second phonetic symbol, which is different than a particular symbol representing part or whole of input symbol of the first transition, as input symbol, and a third transition that has a third phonetic symbol, which represents the particular symbol or silence, as input symbol.

11 Claims, 7 Drawing Sheets

(51) Int. Cl.
 G10L 15/18 (2013.01)
 G10L 15/02 (2006.01)
 G10L 15/28 (2013.01)
 *G10L 15/197* (2013.01)
(52) U.S. Cl.
 CPC ............ *G10L 15/285* (2013.01); *G10L 15/14* (2013.01); *G10L 15/142* (2013.01); *G10L 15/148* (2013.01); *G10L 15/197* (2013.01); *G10L 2015/025* (2013.01); *G10L 2015/027* (2013.01)

(56) References Cited

U.S. PATENT DOCUMENTS

| | | | | |
|---|---|---|---|---|
| 5,806,032 | A * | 9/1998 | Sproat | G10L 15/193 704/255 |
| 7,711,561 | B2 | 5/2010 | Hogenhout et al. | |
| 7,743,011 | B2 * | 6/2010 | Beesley | G06F 17/273 704/232 |
| 7,895,040 | B2 | 2/2011 | Sakai et al. | |
| 8,275,730 | B2 | 9/2012 | Nagao | |
| 8,311,825 | B2 | 11/2012 | Chen | |
| 8,589,164 | B1 | 11/2013 | Mengibar et al. | |
| 8,744,836 | B2 | 6/2014 | Nagao | |
| 8,943,006 | B2 | 1/2015 | Nagao | |
| 8,972,243 | B1 * | 3/2015 | Strom | G10L 15/193 704/1 |
| 9,123,339 | B1 * | 9/2015 | Shaw | G10L 15/22 |
| 9,275,039 | B2 | 3/2016 | Nagao | |
| 9,502,031 | B2 * | 11/2016 | Paulik | G10L 15/19 |
| 10,255,911 | B2 * | 4/2019 | Malinowski | G10L 15/083 |
| 2006/0184365 | A1 | 8/2006 | Odell et al. | |
| 2007/0225977 | A1 * | 9/2007 | Emam | G06F 17/273 704/235 |
| 2010/0082522 | A1 * | 4/2010 | Nagao | G06N 5/02 706/54 |
| 2013/0179158 | A1 | 7/2013 | Nakamura et al. | |
| 2014/0214416 | A1 * | 7/2014 | Yue | G10L 15/083 704/231 |
| 2015/0178285 | A1 | 6/2015 | Nagao | |
| 2015/0179166 | A1 | 6/2015 | Nagao | |
| 2015/0179177 | A1 * | 6/2015 | Nagao | G10L 15/083 704/201 |
| 2015/0220074 | A1 | 8/2015 | Nagao | |
| 2016/0086096 | A1 | 3/2016 | Nagao et al. | |
| 2016/0155440 | A1 | 6/2016 | Nagao | |
| 2016/0321550 | A1 | 11/2016 | Nagao | |
| 2017/0263242 | A1 | 9/2017 | Nagao | |

FOREIGN PATENT DOCUMENTS

| | | |
|---|---|---|
| JP | 2006-243213 A | 9/2006 |
| JP | 2007-225931 A | 9/2007 |
| JP | 2008-26721 | 2/2008 |
| JP | 4241771 | 3/2009 |
| JP | 4322615 | 9/2009 |
| JP | 2010-79723 | 4/2010 |
| JP | 2010-139963 | 6/2010 |
| JP | 2011-198126 | 10/2011 |
| JP | 4956334 | 6/2012 |
| JP | 4977153 | 7/2012 |
| JP | 5121650 | 1/2013 |
| JP | 2013-65188 | 4/2013 |
| JP | 2013-164572 | 8/2013 |
| JP | 2013-235117 | 11/2013 |
| JP | 2015-121707 | 7/2015 |
| JP | 2015-121708 | 7/2015 |
| JP | 2015-121709 | 7/2015 |
| JP | 2015-143800 | 8/2015 |
| JP | 2016-500843 A | 1/2016 |
| JP | 2016-61975 | 4/2016 |
| JP | 2016-102947 | 6/2016 |
| JP | 2016-212129 | 12/2016 |
| JP | 2017-167188 | 9/2017 |
| WO | WO 2016/099301 A1 | 6/2016 |

OTHER PUBLICATIONS

Nanjo, H., et al., "Speaking-Rate Dependent Decoding and Adaptation for Spontaneous Lecture Speech Recognition", Proc. of ICASSP, pp. I-727-I-728 (2002).

* cited by examiner

FIG.8

```
START
  ↓
RECEIVE SPEECH                                    ~S201
  ↓
EXTRACT FEATURE OF SPEECH                         ~S202
  ↓
REFER TO WFST AND SEARCH FOR
RECOGNITION RESULT THAT IS                        ~S203
COMPATIBLE WITH FEATURE
  ↓
END
```

FIG.9

```
GenerateL1
1   foreach (p,r) in Lexicon
2       q_p ← q_initial
3       for i from 1 to |p|
4           q_n ← create a state
5           if i = |p|
6               F ← F ∪ {q_n}
7           E ← E ∪ {(q_p,q_n,p_i,r_i,0)}
8           if p_i ∈ S ∧ (i = |p| ∨ p_i ≠ p_{i+1})
9               E ← E ∪ {(q_n,q_n,p_i, ε ,w_1)}
10          q_p ← q_n
```

FIG.10

```
ModifyL1
1  foreach e ∈ E
2    if in(e) ∈ S ∧ (|{e' ∈ E | in(e) ≠ in(e') ∧ n(e) = p(e')}| ≠ 0 ∨ n(e) ∈ F)
3      E' ← E' ∪ {(n(e),n(e),in(e), ε ,w₁)}
4  E ← E ∪ E'
```

FIG.11

```
GenerateL2
1  foreach (p,r) in Lexicon
2    Q_p ← {q_initial} , i ← 1
3    while i ≤ |p|
4      q_n ← create a state
5      if i = |p|
6        F ← F ∪ {q_n}
7      E ← E ∪ {(q',q_n,p_i,r_i,0) | q' ∈ Q_p}
8      q_p ← q_n , Q_p ← {q_n}
9      if p_i ∈ S ∧ (i = |p| ∨ p_i ≠ p_{i+1})
10       q_n ← create a state
11       E ← E ∪ {(q_p,q_n,p_i, ε ,w₂), (q_n,q_n,p_i, ε ,w₁)}
12       if i = |p|
13         F ← F ∪ {q_n}
14       else
15         Q_p ← Q_p ∪ {q_n}
16     i ← i + 1
```

```
ModifyL2
1  foreach e ∈ E
2    if in(e) ∈ S ∧ ((|{e' ∈ E | in(e) ≠ in(e') ∧ n(e) = p(e')}| ≠ 0) ∨ n(e) ∈ F)
3      q_n ← create a state
4      E' ← E' ∪ {(n(e),q_n,in(e), ε ,w_2), (q_n,q_n,in(e), ε ,w_1)}
5      if n(e) ∈ F
6        F ← F ∪ {q_n}
7      else
8        E' ← E' ∪ {(q_n,n(e'),in(e'), ε ,0) | e' ∈ E ∧ n(e) = p(e')}
9  E ← E ∪ E'
```

GENERATION DEVICE, RECOGNITION SYSTEM, AND GENERATION METHOD FOR GENERATING FINITE STATE TRANSDUCER

CROSS-REFERENCE TO RELATED APPLICATIONS

This application is based upon and claims the benefit of priority from Japanese Patent Application No. 2016-142629, filed on Jul. 20, 2016; the entire contents of which are incorporated herein by reference.

FIELD

An embodiment described herein relates generally to a generation device, a recognition system, and a generation method for generating finite state transducer.

BACKGROUND

Among spontaneous speeches, there are speeches having a faster-than-normal utterance rate or a slower-than-normal utterance rate. As one of the methods for recognizing such speeches, a method is known in which an utterance rate classifier and a plurality of utterance-rate-dependent models are used.

However, in the conventional technology, there occurs an increase in the processing load because of performing an operation of determining the utterance rate. Moreover, since a plurality of models is used, it becomes necessary to have a larger memory area.

BRIEF DESCRIPTION OF THE DRAWINGS

FIG. 8 is a flowchart for explaining a recognition operation performed according to the embodiment;

FIG. 9 is a diagram illustrating examples of a pseudo-code representing a generation method for a first configuration;

FIG. 10 is a diagram illustrating examples of a pseudo-code representing a generation method for the first configuration;

FIG. 11 is a diagram illustrating examples of a pseudo-code representing a generation method for a second configuration.

DETAILED DESCRIPTION

Figure 1:
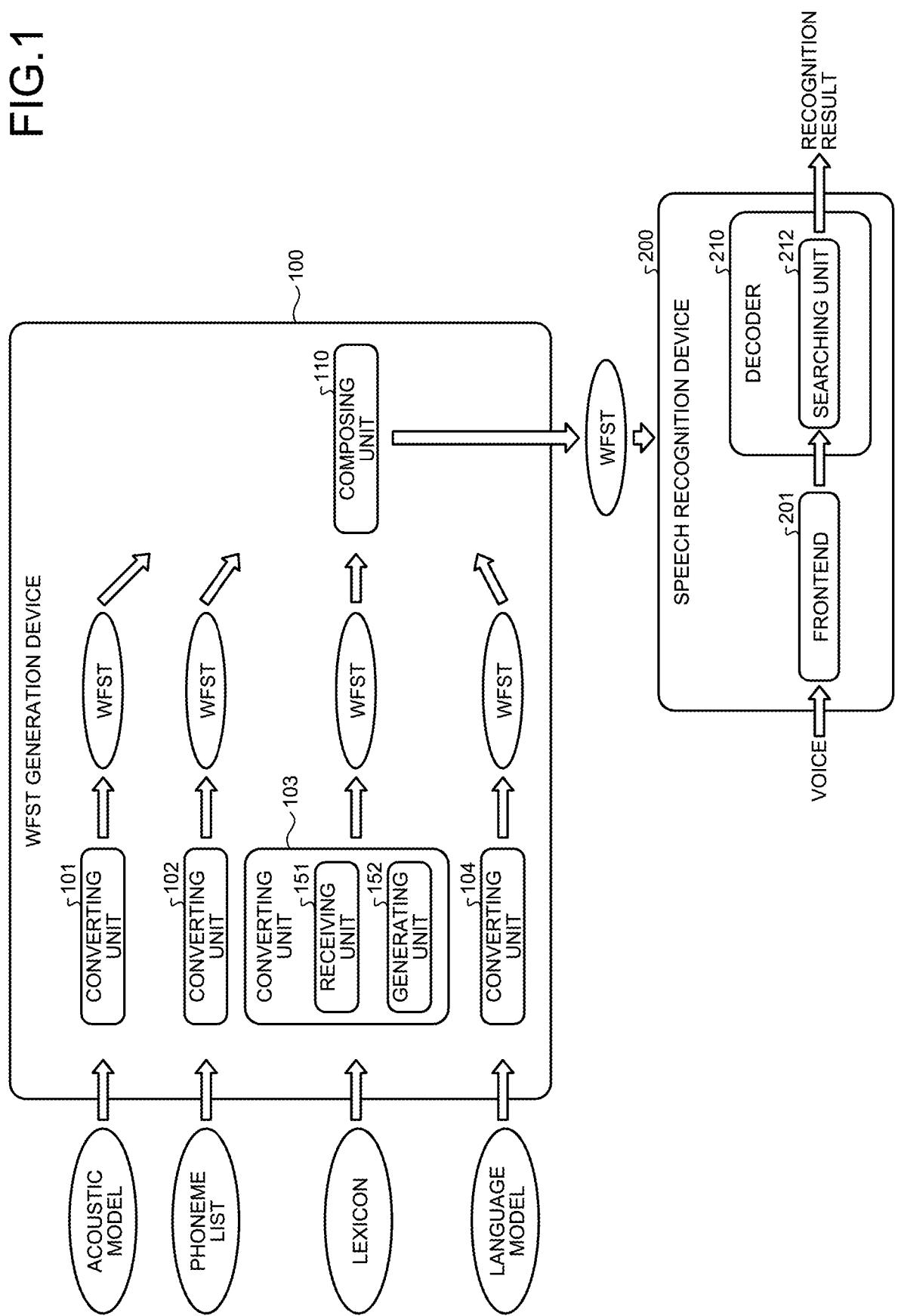
FIG. 1 is a block diagram of a recognition system according to an embodiment.

According to one embodiment, a generation device includes a receiving unit and a generating unit. The receiving unit receives a model representing correspondence between one or more phonetic symbols and one or more words. The generating unit generates a first finite state transducer based on the model, the first finite state transducer at least including, as outgoing transitions from a first state representing transition destination of a first transition which has a first phonetic symbol of a predetermined type as input symbol, a second transition that has a second phonetic symbol, which is different than a particular symbol representing part or whole of input symbol of the first transition, as input symbol, and a third transition that has a third phonetic symbol, which represents the particular symbol or silence, as input symbol.

An exemplary embodiment of a generation device according to the embodiment is described below in detail with reference to the accompanying drawings.

The generation device according to the embodiment generates a weighted finite state transducer (WFST) corresponding to slower-than-normal speeches (in the following explanation, called slow utterances). Moreover, a recognition device according to the embodiment performs speech recognition using the generated WFST. As a result, normal utterances as well as slow utterances can be recognized using only a single model. Since speech recognition can be performed with only a single model in which the utterance rate need not be determined, it enables achieving reduction in the processing load as well as achieving reduction in the memory area required to store the model.

A WFST corresponding to slow utterances is, for example, a WFST in which, at appropriate positions of a WFST L obtained from a lexicon representing the correspondence between utterances and words, a loop is embedded that is capable of processing, for an arbitrary number of times, the phonetic symbol appearing immediately before. Herein, an appropriate position is immediately before or immediately after a phonetic symbol p that can be uttered slowly. Herein, the embedded loop can recognize the phoneme p.

Definition

A WFST is a finite state automaton in which a transition has an input symbol, an output symbol, and a weight assigned thereto. A phonetic symbol is a symbol representing a pronunciation, and can be used as the input symbol in a WFST L. For example, a phoneme or a syllable represents a phonetic symbol. A slowly-utterable phonetic symbol implies a phonetic symbol that, in a language recognizable to a speech recognition device, corresponds to a slowly-utterable pronunciation. For example, a vowel or a syllabic nasal represents a slowly-utterable phonetic symbol.

A path in a WFST is formed by one or more transitions satisfying the condition that, when $e_i$ represents the i-th transition (where i is an integer equal to or greater than one), the next state of the transition $e_i$ is same as the previous state of the transition $(e_i+1)$.

The input of a path represents an input symbol string in which input symbols of transitions constituting the path are concatenated. In an identical manner, the output of a path represents an output symbol string in which output symbols of transitions constituting the path are concatenated. That is, when in(e) represents the input symbol of a transition e and when out(e) represents the output symbol of the transition e, the input of a path $\pi=e_1 e_2 e_3 \ldots e_n$ becomes equal to $in(e_1)in(e_2)in(e_3) \ldots in(e_n)$. Herein, n represents the number of transitions. In an identical manner, the output of the path becomes equal to $out(e_1)out(e_2)out(e_3) \ldots out(e_n)$. Meanwhile, p(e) represents the previous state of the transition e, while n(e) represents the next state of the transition e. Moreover, ε indicates that an input symbol or an output symbol is empty.

FIG. 1 is a block diagram illustrating an exemplary configuration of a recognition system according to the embodiment. As illustrated in FIG. 1, the recognition system according to the embodiment includes a WFST generation device 100 (an example of a generation device) and a speech recognition device 200 (an example of a recognition device).

The WFST generation device 100 generates a WFST required in operating the speech recognition device 200. Then, the speech recognition device 200 uses the WFST output by the WFST generation device 100, and converts the input speech into a word string.

The speech recognition device 200 uses a WFST formed by, for example, composing the following four WFSTs.

WFST H that represents the structure of an acoustic model such as a hidden Markov model (HMM)
WFST C that converts context-dependent phonemes into context-independent phonemes
WFST L that converts context-independent phonemes into words
WFST G that is a language model representing a sequence of words Herein, it is assumed that a phonetic symbol is a phoneme. Meanwhile, in the following explanation, a WFST H, a WFST C, a WFST L, and a WFST G are sometimes simply written as H, C, L, and G, respectively. The speech recognition device 200 performs speech recognition using a WFST HCLG that is formed by composing and optimizing the four WFSTs. Alternatively, composing and optimization prior to a speech recognition operation can be performed with respect to only some of the four WFSTs, and the remaining WFSTs can be composed during the speech recognition operation.

Meanwhile, when phonemes obtained from an acoustic model are not context-dependent phonemes but are context-independent phonemes, that is, when the output symbols of the WFST H are context-independent phonemes; then the WFST C is not required. In the case in which some other method other than the HMM is used in an acoustic model, instead of using the WFST H and the WFST C, WFSTs corresponding to the WFST H and the WFST C are used as acoustic-model-based WFSTs. Herein, examples of the other method include a recurrent neural network (RNN) in which the connectionist temporal classification (CTC) is applied.

The WFST generation device 100 according to the embodiment generates, as the WFST L, a WFST corresponding to slow utterances. If the WFST L generated according to the embodiment is used in place of the conventional WFST L, then various speech recognition devices 200 using WFSTs become able to deal with slow utterances.

The WFST generation device 100 includes converting units 101, 102, 103, and 104; and a composing unit 110. The converting units 101 to 104 respectively convert an acoustic model, a phoneme list, a lexicon, and a language model into WFSTs (the WFST H, the WFST C, the WFST L, and the WFST G). The composing unit 110 generates a WFST HCLG by composing the WFSTs output by the converting units 101 to 104, and performs optimization as may be necessary. When the WFST C is not required, the converting unit 102 may not be disposed. In that case, the composing unit 110 can generate a WFST HLG by composing the WFSTs output by the converting units 101, 103, and 104; and can perform optimization as may be necessary.

An acoustic model is a model for converting a sound into a sub-word. A lexicon is a model for converting a sub-word into a word. A language model is a model indicating the likelihood or the limitation of a sequence of words. A language model can be a statistical language model, or can be expressed using grammar. Herein, grammar implies information in which, for example, a sequence of recognizable words is written.

Meanwhile, it is not necessary that the WFST generation device 100 outputs only a single WFST. In the case in which the WFST generation device 100 outputs a plurality of WFSTs, the speech recognition device 200 can be configured to compose the WFSTs in a dynamic manner.

Given below is the detailed explanation of the configuration of each device illustrated in FIG. 1. Firstly, the explanation is given about the WFST generation device 100.

Regarding the method by which the converting unit 101 converts an acoustic model into a WFST, regarding the method by which the converting unit 102 converts a phoneme list into a WFST, and regarding a method by which the converting unit 104 converts a language model into a WFST; it is possible to implement any conventional methods.

The converting unit 103 includes a receiving unit 151 and a generating unit 152. The receiving unit 151 receives a model representing the correspondence between one or more phonetic symbols and one or more words. Herein, examples of a model include a lexicon representing the correspondence between one or more phonetic symbols and one or more words, and a WFST L generated according to a conventional method.

Based on the received model, the generating unit 152 generates a WFST L having the following transitions as the outgoing transitions from such a state (a first state) which represents the transition destination of the transition (a first transition) having the phonetic symbol of a predetermined type (a first phonetic symbol) as the input symbol.

(T1) a transition (a second transition) that has a phonetic symbol other than a particular symbol (a second phonetic symbol) as the input.
(T2) a transition (a third transition) that has a phonetic symbol (a third phonetic symbol) indicating the particular symbol or silence as the input.

The phonetic symbol of a predetermined type (the first phonetic symbol) is, for example, a phonetic symbol representing the pronunciation of a particular phoneme, such as a vowel or a syllabic nasal, that is slowly utterable. The particular symbol is a symbol representing the pronunciation of the particular phoneme, which is the input symbol of the first transition.

Such a WFST L can be written in other words as follows, for example.

(1) The WFST L includes a path π that outputs words w and that has a phonetic symbol string p of the words w as the input. Herein, the i-th pronunciation $p_i$ of the phonetic symbol string p is assumed to be the slowly-utterable phonetic symbol (the first phonetic symbol).
(2) From among the transitions constituting the path π, the outgoing transition from a state q (a first state), which is the next state of the transition (a first transition) having the input symbol $p_i$, includes at least the following two transitions.
(T1') a transition having an input symbol $p_{i+1}$ (a second transition)
(T2') a transition having an input symbol x (a third transition)

Herein, x is the phonetic symbol representing the pronunciation $p_i$ or silence.

Given below is the explanation of the speech recognition device 200. Herein, the speech recognition device 200 includes a front-end 201 and a decoder 210.

The front-end 201 performs an operation of detecting speech segments from an input speech, and performs an operation of extracting the feature of the speech. The decoder 210 includes a searching unit 212.

The searching unit 212 refers to the WFST HCLG input from the WFST generation device 100, and recognizes a word or a word string corresponding to the input from the front-end 201. For example, using the feature and the acoustic model, the searching unit 212 takes into account the acoustic scores, each of which indicates the degree of coincidence of the speech with respect to one of the paths in the WFST, and the weights of those paths; and outputs, as the recognition result, the word string present in the path which is believed to be the closest to the input speech.

Given below is the explanation of a WFST L generated according to the embodiment. Regarding a WFST L corresponding to slow utterances, it is possible to think of several configurations. Herein, the explanation is given about a configuration in which, when only a single word is included in the WFST L, it results in a deterministic WFST. Although it is possible to think of a number of redundant WFSTs, the same configuration can be achieved by transforming the WFSTs by a known method such as determinization or minimization. Hence, that explanation is not given. Meanwhile, regarding a phonetic symbol that, although can be slowly uttered, is less likely to be input to the speech recognition device 200; that phonetic symbol may not be included in the slowly-utterable phonetic symbols.

First Configuration

Figure 2:
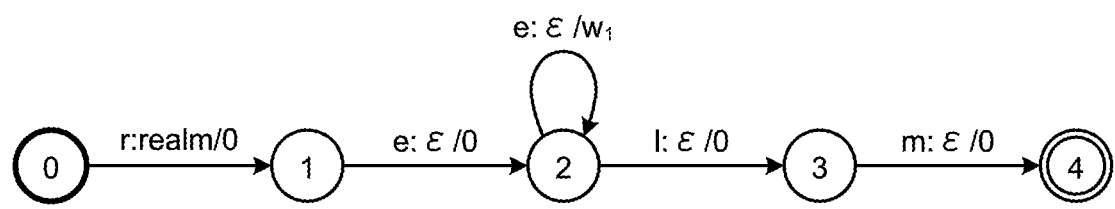
FIG. 2 is a diagram illustrating examples a WFST L corresponding to slow utterances.

FIG. 2 is a diagram illustrating an example of the simplest WFST L corresponding to slow utterances. For ease of explanation, a WFST L is illustrated that represents only a word "realm" having the phonetic symbol string "relm". Herein, "e" is assumed to be the slowly-utterable phonetic symbol. In this example, the other phonetic symbols "r", "l", and "m" are not treated as slowly-utterable phonetic symbols. In FIG. 2, the circles represent the states of the WFST, and the arrows represent the transitions. Moreover, the circle drawn with a heavy line represents the initial state, while the double circle represents the final state. Furthermore, the numbers written inside the circles represent the state numbers. Moreover, the characters on the left side of ":" represent the input symbol, the characters between ":" and "/" represent the output symbol, and the characters on the right side of "/" represent the weight. Regarding the state having the state number 2, a weight $w_1$ of the self-transition is a real number representing the weight at the time when a slow utterance is recognized. If it is assumed that, smaller the weight, the better is the path; then it implies that, greater the weight $w_1$, the more difficult it becomes to recognize a slow utterance. Moreover, slower the rate of an utterance, the more difficult it is to recognize that utterance. For example, when an input symbol string "relm" is input to the WFST L, the word "realm" is output that has the weight 0. If "reelm" is input as a result of a little slower utterance, the weight becomes equal to $w_1$. If "reeelm" is input as a result of a further slower utterance, the weight becomes equal to $2w_1$.

Figure 3:
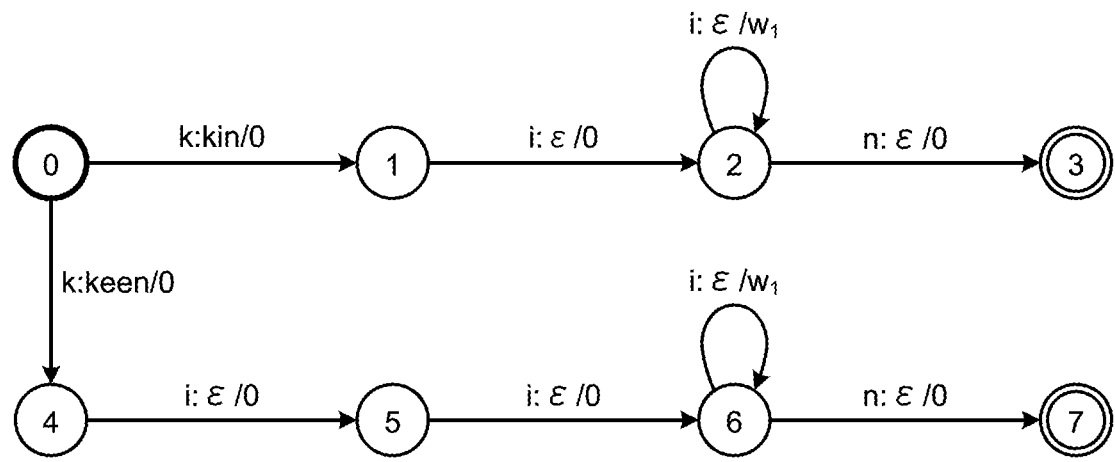
FIG. 3 is a diagram illustrating examples a WFST L corresponding to slow utterances.

The reason for assigning a weight to the self-transition is as follows. When the input symbol string corresponding to a slow utterance is same as the input symbol string of a different word not uttered slowly, the weight of the self-transition makes it easier to distinguish between the two input symbol strings. For example, assume that a word "kin" having the phonetic symbol string "kin" and a word "keen" having the phonetic symbol string "kiin" are included in the WFST L. Moreover, "i" is assumed to be the slowly-utterable phonetic symbol. FIG. 3 is a diagram illustrating an example the WFST L corresponding to the slow utterance in that case.

When the phonetic symbol string "kiin" is input in the WFST L, the words "kin" and "keen" are output. However, since the path corresponding to the word "keen" has the weight 0 and the path corresponding to the word "kin" has the weight $w_1$, the two words have different weights unless the weight $w_1$ is equal to the weight 0. In the case in which a path is a better path if the weight is smaller, if it is assumed that the weight $w_1$ is greater than the weight 0 and that the language model does not have any effect, then the speech recognition device 200 outputs the word "keen". Meanwhile, the weight $w_1$ can be set to be equal to the weight 0. However, in that case, which of the two words is to be output as the recognition result is determined according to the language model.

Regarding the phonetic symbol corresponding to a slow utterance, if the same phonetic symbol appears in succession, then the self-transition can be assigned only to the next state of the transition that has the last phonetic symbol assigned thereto. With reference to FIG. 3, the self-transition is assigned to the state having the state number 6 in the path corresponding to the word "keen". Of the same phonetic symbols, although the self-transition can be assigned to the phonetic symbol at the start or to a phonetic symbol along the way, it is only redundant. That is because there is no change in the phonetic symbol string that can be received by the WFST L, and the self-transition shifts toward the end as a result of determinization. Besides, there is an increase in the processing time required for determinization.

For example, with reference to FIG. 2, the transitions and the states generated by the generating unit 152 are as follows.

First phonetic symbol: "e"

First transition: the transition from the state having the state number 1 to the state having the state number 2

First state: the state having the state number 2

Second phonetic symbol: "l"

Second transition: the transition from the state having the state number 2 to the state having the state number 3

Third phonetic symbol: "e"

Third transition: the self-transition from the state having the state number 2 to the state having the state number 2

Second Configuration

Figure 4:
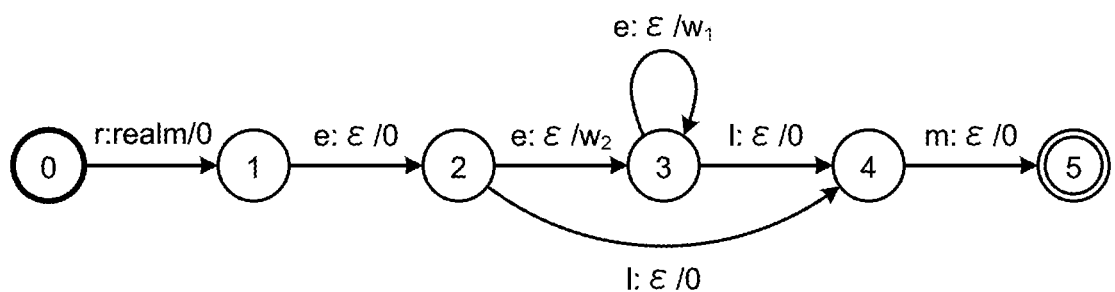
FIG. 4 is a diagram illustrating examples a WFST L corresponding to slow utterances.

FIG. 4 is a diagram illustrating an example of a WFST L configured in such a way that, when a slow utterance is recognized, a weight $w_2$ different than the weight $w_1$ can be applied. In the configuration illustrated in FIG. 2, in the case in which the weight $w_1$ is greater than the weight 0; slower the utterance, the greater is the effect of the weight $w_1$ assigned to the self-transition and the more difficult it becomes to recognize the concerned word. On the other hand, in the configuration illustrated in FIG. 4, if the weight $w_1$ is set to 0 and if the weight $w_2$ is set to a value other than 0, only the weight $w_2$ is applied with respect to slow utterances. Hence, there occurs no difference in the weights in the case of a little slow utterance and in the case of a very slow utterance. As a result, while distinguishing the utterances that cannot be made slowly from the slow utterances, it becomes possible to eliminate the dependency of the slow utterances on the utterance rate.

Meanwhile, in a phonetic symbol string, when the same slowly-utterable phonetic symbol appears in succession; in an identical manner to the first configuration, a path corresponding to slow utterances can be created with respect to the last of those phonetic symbols. Moreover, it is also possible to not use the self-transition of the state having the state number 3. In that case, although it is not possible to deal with extremely slow utterances, it is still possible to deal with slow utterances as compared to the conventional method.

In the case of the second configuration, the generating unit 152 generates the WFST L further including the following transitions as the outgoing transitions from the state representing the transition destination of the third transition (i.e., from the second state).

(T3) a transition (a fourth transition) that has the first phonetic symbol or the third phonetic symbol as the input and that represents transition to the second state.

(T4) a transition (a fifth transition) that has the second phonetic symbol as the input.

For example, with reference to FIG. 4, the transitions and the states generated by the generating unit 152 are as follows.

First phonetic symbol: "e"
First transition: the transition from the state having the state number 1 to the state having the state number 2
First state: the state having the state number 2
Second phonetic symbol: "1"
Second transition: the transition from the state having the state number 2 to the state having the state number 4
Third phonetic symbol: "e"
Third transition: the transition from the state having the state number 2 to the state having the state number 3
Second state: the state having the state number 3
Fourth transition: the self-transition from the state having the state number 3 to the state having the state number 3
Fifth transition: the transition from the state having the state number 3 to the state having the state number 4

Meanwhile, each WFST L explained above (with reference to FIGS. 2 to 4) is able to receive the pronunciation corresponding to only a single word. Alternatively, the WFST L can be configured to receive a word string made of an arbitrary number of words. In the case in which the speech recognition device 200 recognizes a word string made of an arbitrary number of words, a transition having an empty (ε) input symbol as well as an empty (ε) output symbol and having the weight 0 can be added from the final state to the initial state of the WFST L. In other words, an operation called "closure" can be applied to the WFST L.

Meanwhile, if the weight $w_1$ is equal to the weight 0 in FIGS. 2 and 3 and if the weights $w_1$ and $w_2$ are equal to the weight 0 in FIG. 4, then the WFST L can be expressed not as a WFST but simply as a finite state transducer (FST).

Separate Utterance

The first and second configurations represent exemplary configurations corresponding to slow utterances in the case in which slowly-utterable pronunciation is extended (lengthened). However, the type of slow utterances is not limited to those examples. Alternatively, for example, phonemes or syllables can be uttered separately, and the utterance can be treated as a slow utterance. For example, in Japanese language, an utterance can be made by separating the pronunciation in the unit of syllables. In other words, it implies inserting silence in between the syllables. In order to deal with such type of utterances, after a slowly-utterable phonetic symbol has appeared, instead of adding a transition in which the same phonetic symbol is set as the input symbol, a transition can be added in which a phonetic symbol "sil" representing silence is set as the input symbol. With reference to FIG. 2, in the self-transition of the state having the state number 2, the input symbol is set to "sil" instead of "e". With reference to FIG. 3, in the self-transition of the states having the state numbers 2 and 6, the input symbol is set to "sil" instead of "i". With reference to FIG. 4, in the transition to the state having the state number 3 and in the self-transition of the state having the state number 3, the input symbol "e" is substituted with "sil".

Figure 5:
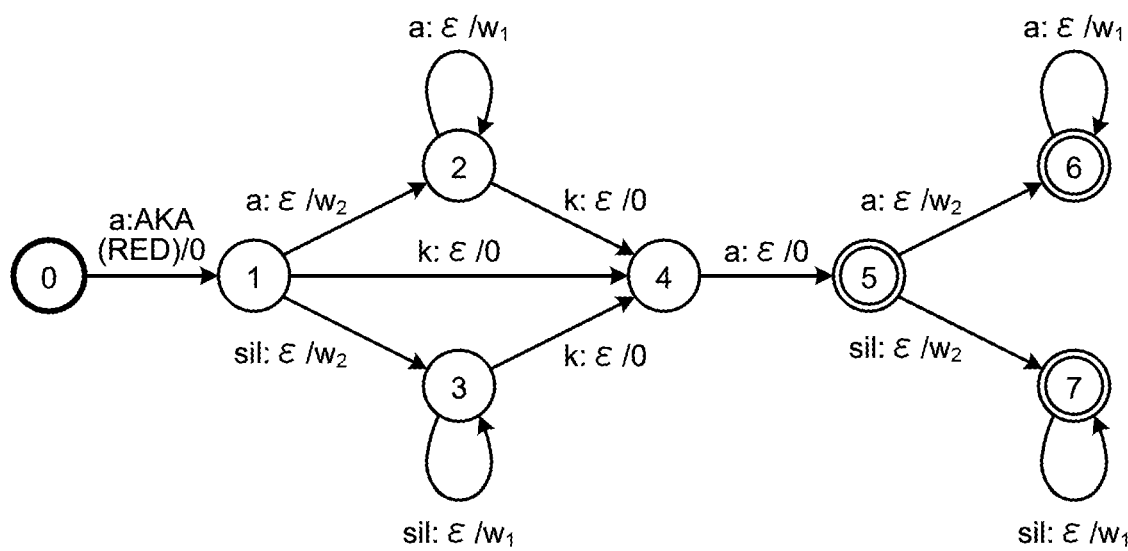
FIG. 5 is a diagram illustrating examples a WFST L corresponding to slow utterances.

Meanwhile, in order to deal with lengthening the pronunciation as well as separating at syllables; an alternative configuration can be such that, instead of substituting the input symbols, transitions having the substituted input symbols are added. FIG. 5 is a diagram illustrating an example of a WFST L configured in such a manner. In FIG. 5 is illustrated an example in which the WFST L receives only a Japanese word "aka (red)" having the phonetic symbol string "aka". Herein, the WFST L can be configured in such a way that the state having the state number 2 is same as the state having the state number 3 and the state having the state number 6 is same as the state having the state number 7. In that case, when a single phonetic symbol is uttered slowly, the concerned word can be recognized even if there is a mix of lengthened utterances and separate utterances.

Meanwhile, there are times when processing is done under the premise that silence is present in between words. That can be implemented by adding, to the WFST L, a transition having the initial state as the previous state, having the final state as the next state, and having "sil" as the input symbol. In that case, the transition from the state having the state number 5 to the state having the state number 7 and the self-transition of the state having the state number 7 become redundant.

Case in which phonetic symbol represents longer unit than phoneme

As a phonetic symbol, it is also possible to select a longer unit than a phoneme. For example, a syllable can be used as a phonetic symbol. In that case, in a syllable that can be considered for a slow utterance, a slowly-utterable phoneme appears at the start or at the end. If the initial phoneme of a syllable x is a slowly-utterable phoneme, the WFST L is configured in such a way that a syllable made of only that slowly-utterable phoneme can repetitively appear before the syllable x. In an identical manner, if the last phoneme of a syllable x is a slowly-utterable phoneme, the WFST L is configured in such a way that a syllable made of only that slowly-utterable phoneme can repetitively appear after the syllable x. Herein, it is assumed that a syllable can be expressed using a combination of phonemes. It implies that a syllable is expressed using a phoneme string in which the phonemes have the length equal to or greater than one. Meanwhile, a syllable may be expressed using some other symbols or characters instead of using a phoneme string. However, in that case, a slowly-utterable syllable needs to be associated with the syllable that, of the concerned syllable, represents the slowly-utterable portion.

In the case of using syllables as phonetic symbols, a phonetic symbol of a predetermined type (a first phonetic symbol) is a syllable that includes a particular phoneme of a predetermined type, such as a vowel or a syllabic nasal, at the end. Herein, a particular symbol is a symbol representing the pronunciation of the last particular phoneme included in the input symbol of the first transition.

Figure 6:
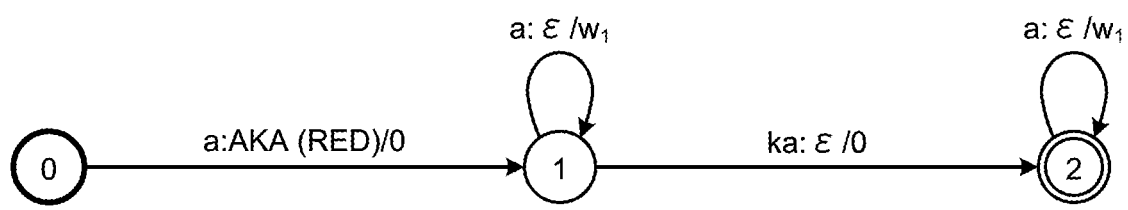
FIG. 6 is a diagram illustrating an example of a WFST L in the case in which syllables are used as phonetic symbols.

FIG. 6 is a diagram illustrating an example of a WFST L in the case in which syllables in Japanese language are used as phonetic symbols. In FIG. 6 is illustrated an example in which the configuration method identical to the first configuration is implemented in the case in which syllables represent phonetic symbols. Since the first syllable "a" is same as in the case of using a phoneme, the self-transition of the state having the state number 1 has the input symbol "a". On the other hand, the last phoneme of the second syllable "ka" is "a". Accordingly, in the state having the state number 2, the input symbol of the self-transition is not "ka" but is "a". In this example, although a syllable is expressed using a phoneme string, it can alternatively be expressed using characters different than the characters expressing the phonemes. For example, in the case of expressing syllables in hiragana of Japanese language, the English syllable "ka" is substituted with a hiragana syllable pronounced as "ka" and the English syllable "a" is substituted with a hiragana syllable pronounced as "a". Still alternatively, instead of using the actual characters, it is possible to use the numbers corresponding to those characters.

Figure 7:
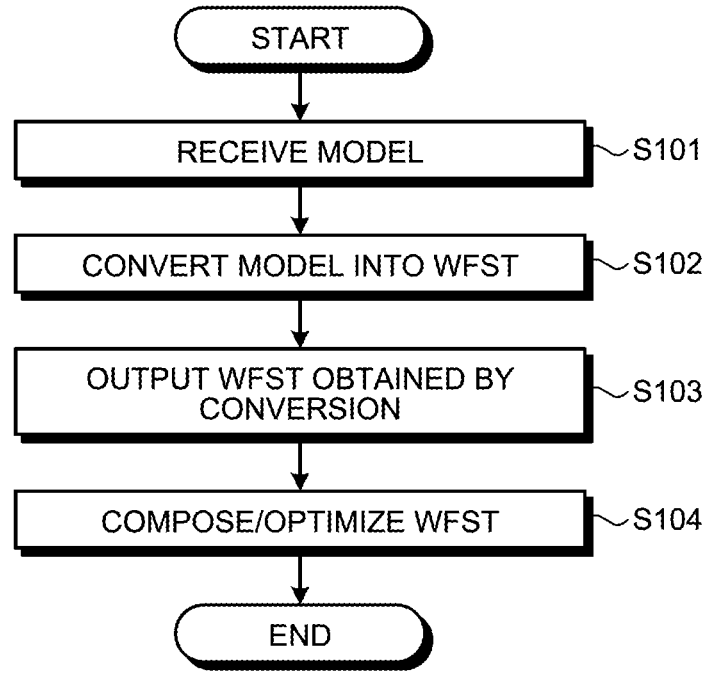
FIG. 7 is a flowchart for explaining a generation operation performed according to the embodiment.

Explained below with reference to FIG. 7 is a generation operation performed by the WFST generation device 100 that is configured in the manner described above according to the embodiment. FIG. 7 is a flowchart for explaining an example of the generation operation performed according to the embodiment.

Firstly, each converting unit (each of the converting units 101 to 104) receives input of a model serving as the basis for a conversion operation (Step S101). Then, each converting unit converts the received model into a WFST (Step S102). Subsequently, each converting unit outputs the WFST, which is obtained by conversion, to the composing unit 110 (Step S103).

For example, the converting unit 101 receives an acoustic model, converts the acoustic model into a WFST H, and outputs the WFST H. The converting unit 102 receives a phoneme list, converts the phoneme list into a WFST C, and outputs the WFST C. The converting unit 103 receives a lexicon, converts the lexicon into a WFST L, and outputs the WFST L. The converting unit 104 receives a language model, converts the language model into a WFST G, and outputs the WFST G.

The composing unit 110 composes the WFSTs output from the converting units, and performs optimization as may be necessary (Step S104). For example, the composing unit 110 composes the WFST H, the WFST C, the WFST L, and the WFST G, and generates a WFST HCLG.

Explained below with reference to FIG. 8 is a recognition operation performed by the speech recognition device 200 configured in the abovementioned manner according to the embodiment. FIG. 8 is a flowchart for explaining an example of the recognition operation performed according to the embodiment.

Firstly, the front-end 201 receives input of a target speech for recognition (Step S201). Then, the front-end 201 analyzes the speech and extracts the feature of the speech (Step S202). The searching unit 212 refers to the WFST composed by the composing unit 110, searches for the recognition result (a word string) that is compatible with the extracted feature, and outputs the recognition result (Step S203).

Given below is the detailed explanation of a generation method by which the converting unit 103 (the receiving unit 151 and the generating unit 152) generates a WFST L.

First generation method for first configuration

FIG. 9 is a diagram illustrating an example of a pseudo-code representing a generation method for the first configuration. In FIG. 9 is illustrated an exemplary generation method by which the generating unit 152 generates a WFST L in the case in which a lexicon is received as the model representing the correspondence between phonetic symbols and words.

A lexicon is a pair (phonetic symbol string, word). Herein, $p_i$ represents the i-th phonetic symbol of the phonetic symbol string p. Moreover, |p| represents the length of the phonetic symbol string. Regarding a word r, $r_i$ represents the concerned word if i=1 holds true but represents a symbol ε, which represents emptiness, in any other case. That is, $r = r_1 r_2 r_3 \ldots = r_1 \varepsilon \varepsilon \ldots = r_1$ holds true. For example, in the case of a pair (relm, realm), the following holds true: $p_1$=r, $p_2$=e, $p_3$=l, $p_4$=m, $r_1$=realm, $r_2$=ε, $r_3$=ε, and $r_4$=ε.

Meanwhile, S represents a set of slowly-utterable phonetic symbols. For example, when phonemes represent the phonetic symbols, at least all vowels are included in the set S. Moreover, $q_{initial}$ represents the initial state. Furthermore, F represents the set of final states of the WFST L. Moreover, E represents the set of transitions constituting the WFST L. Herein, it assumed that a transition is created by adding the transition to the set E. At the start of the operations illustrated in FIG. 9, it is assumed that the sets E and F are empty sets.

The first line indicates that the operations from the second line to the 10-th line are performed with respect to all pairs (phonetic symbol string, word) included in the lexicon.

In the second line, the initial state is substituted in the state $q_p$.

The third line indicates that the operations from the fourth line to the 10-th line are performed while incrementing, by one, an integer i from 1 to the length of the phonetic symbol string p.

In the fourth line, a new state is generated and is substituted in the state $q_n$.

The fifth line indicates that the operation in the sixth line is performed when the integer i is equal to the length of the phonetic symbol string p.

In the sixth line, the state $q_n$ is set to the final state. That is, the state $q_n$ is added to the set F of final states.

In the seventh line, in the set E of transitions, a transition is added that has the state $q_p$ as the previous state, has the state $q_n$ as the next state, has the phonetic symbol $p_i$ as the input symbol, has $r_i$ as the output symbol, and has the weight 0.

The eighth line indicates that the operation in the ninth line is performed either when the i-th phonetic symbol $p_i$ is a slowly-utterable phonetic symbol and the integer i is equal to the length of the phonetic symbol string p or when the phonetic symbol $p_i$ is different than the next phonetic symbol $p_{i+1}$.

In the ninth line, in the set E of transitions, a self-transition is added that has the state $q_n$ as the previous state, has the state $q_n$ as the next state, has the phonetic symbol $p_i$ as the input symbol, has ε as the output symbol, and has the weight $w_1$.

In the 10-th line, the state $q_n$ is substituted in the state $q_p$.

Second Generation Method for First Configuration

FIG. 10 is a diagram illustrating another example of a pseudo-code representing a generation method for the first configuration. In FIG. 10 is illustrated an exemplary generation method by which the generating unit 152 generates a WFST L in the case in which an existing WFST L, such as a WFST L generated according to a conventional method, is received as the model representing the correspondence between phonetic symbols and words.

For example, regarding a particular state q, when an input symbol σ of an incoming transition is included in the set S, the generating unit 152 adds a self-transition having the input symbol σ in the state q. For ease of explanation, in the pseudo-code illustrated in FIG. 10, it is assumed that each state has only one incoming transition. Accordingly, for each word, there is a single final state. Moreover, it is assumed that, except for the initial state, each state has only one outgoing transition.

That is, it is assumed that the WFST L is created according to a pseudo-code from which the eighth line and the ninth line illustrated in FIG. 9 are excluded. At the start of the operations illustrated in FIG. 10, it is assumed that the set E is a set of transitions constituting a WFST L generated according to a conventional method, and that E' is an empty set.

The first line illustrated in FIG. 10 indicates that the operations in the second and third lines are performed with respect to each transition e in the set E of transitions included in the WFST L.

The second line indicates that the operation in the third line is performed when the following two conditions are satisfied. The first condition is that the transition e has a slowly-utterable phonetic symbol as the input symbol. The second condition is that either the next transition e' of the transition e has a different input symbol or the next state of the transition e is the final state.

In the third line, a self-transition is added to the next state of the transition e. The self-transition has the same input symbol as the input symbol of the transition e, has the output symbol ε, and has the weight $w_1$.

In the fourth line, the transition created in the third line is added to the set E.

First generation method for second configuration

FIG. 11 is a diagram illustrating an example of a pseudo-code representing a generation method for the second configuration. In FIG. 11 is illustrated an exemplary generation method by which the generating unit 152 generates a WFST L in the case in which a lexicon is received as the model representing the correspondence between phonetic symbols and words.

At the start of the operations illustrated in FIG. 11, it is assumed that the sets E and F are empty sets.

The first line indicates that the operations from the second line to the 16-th line are performed with respect to all pairs (phonetic symbol string, word) included in the lexicon.

In the second line, a set of only initial states is substituted in the set $Q_p$ of states, and 1 is substituted in an integer i.

The third line indicates that the operations from the fourth line to the 16-th line are performed when the integer i is equal to or smaller than the length of the phonetic symbol string p.

In the fourth line, a new state is generated and is substituted in the state $q_n$.

The fifth line indicates that the operation in the sixth line is performed when the integer i is equal to the length of the phonetic symbol string p.

In the sixth line, the state $q_n$ is set to the final state. That is, the state $q_n$ is added to the set F of final states.

In the seventh line, in the set E of transitions, a transition is added that has the state included in the set $Q_p$ as the previous state, has the state $q_n$ as the next state, has the phonetic symbol $p_i$ as the input symbol, has $r_i$ as the output symbol, and has the weight 0.

In the eighth line, the state $q_n$ is substituted in the state $q_p$, and a set made of only the state $q_n$ is substituted in the set $Q_p$.

The ninth line indicates that the operations in the ninth line to the 15-th line are performed either when the i-th phonetic symbol $p_i$ is a slowly-utterable phonetic symbol and the integer i is equal to the length of the phonetic symbol string p or when the phonetic symbol $p_i$ is different than the next phonetic symbol $p_{i+1}$.

In the 10-th line, a new state is generated and is substituted in the state $q_n$.

In the 11-th line, in the set E of transitions, the following two transitions are added: a transition that has the state $q_p$ as the previous state, has the state $q_n$ as the next state, has the phonetic symbol $p_i$ as the input symbol, has ε as the output symbol, and has the weight $w_2$; and a self-transition that has the state $q_n$ as the previous state, has the state $q_n$ as the next state, has the phonetic symbol $p_i$ as the input symbol, has ε as the output symbol, and has the weight $w_1$.

The 12-th line indicates that the operation in the 13-th line is performed when the integer i is equal to the length of the phonetic symbol string p, and that the operation in the 15-th line is performed otherwise.

In the 13-th line, the state $q_n$ is added to the set F of the final states.

In the 15-th line, the state $q_n$ is added to the set $Q_p$.

In the 16-th line, the integer i is incremented by one.

Second Generation Method for Second Configuration

Figures 12, 13:
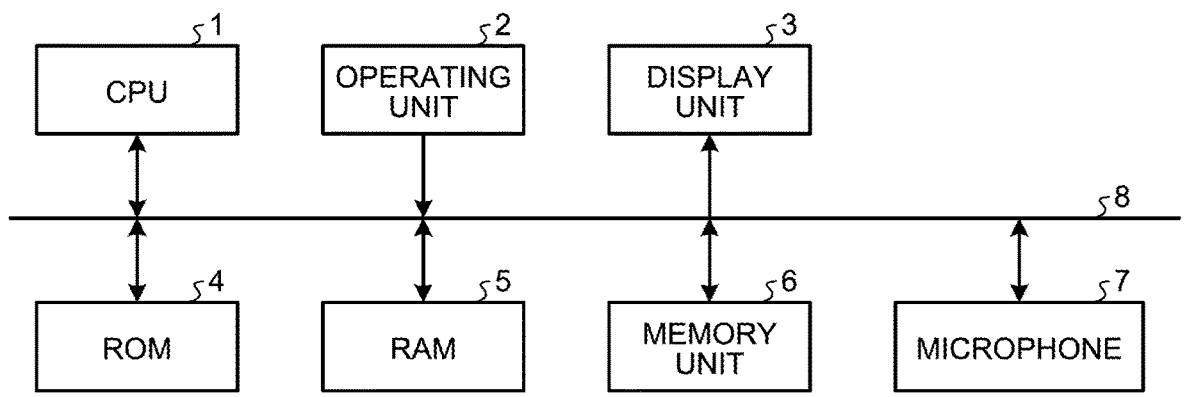
FIG. 12 is a diagram illustrating examples of a pseudo-code representing a generation method for the second configuration.
FIG. 13 is a hardware configuration diagram of the devices according to the embodiment.

FIG. 12 is a diagram illustrating another example of a pseudo-code representing a generation method for the second configuration. In FIG. 12 is illustrated an exemplary generation method by which the generating unit 152 generates a WFST L in the case in which an existing WFST L, such as a WFST L generated according to a conventional method, is received as the model representing the correspondence between phonetic symbols and words.

For ease of explanation, it is assumed that the WFST L is created under the same premise as the premise for the pseudo-code explained with reference to FIG. 10. At the start of the operations illustrated in FIG. 12, it is assumed that the set E is a set of transitions constituting a WFST L generated according to a conventional method, and that E' is an empty set.

The first line indicates that the operations in the second line to the eighth line are performed with respect to each transition e included in the set E.

The second line indicates that the operations in the third line to the eighth line are performed when an input symbol of the transition e is included in the set S and either when the outgoing transition from the next state of the transition e has a different input symbol than the input symbol of the transition e or when the next state of the transition e is the final state.

In the third line, a new state $q_n$ is created.

In the fourth line, in the set E' of transitions, a transition is added that has the next state of the transition e as the previous state, has the state $q_n$ as the next state, has the input symbol of the transition e as the input symbol, has ε as the output symbol, and has the weight $w_2$. Moreover, in the set E' of transitions, a self-transition is added that has the state $q_n$ as the previous state and the next state, has the input symbol of the transition e as the input symbol, has s as the output symbol, and has the weight $w_1$.

The fifth line indicates whether or not the next state of the transition e is the final state and, if the next state of the transition e is the final state, the system control proceeds to the sixth line. Otherwise, the system control proceeds to the eighth line.

In the sixth line, the state $q_n$ is added to the set F of final states.

In the eighth line, in the set E' of transitions, a transition is added that has the state $q_n$ as the previous state, has the next state of the transition e' as the next state, has the input symbol of the transition e' as the input symbol, has ε as the output symbol, and has the weight 0. Herein, e' represents an outgoing transition from the next state of the transition e.

In the ninth line, the transitions created in the fourth and eight lines are added in the set E.

In this way, in the generation device according to the embodiment, normal utterances as well as slow utterances can be recognized using only a single model. Moreover, since speech recognition can be performed using only a single model in which the utterance rate need not be determined, it enables achieving reduction in the processing load as well as achieving reduction in the memory area required to store the model.

Explained below with reference to FIG. 13 is an exemplary hardware configuration applicable in the devices (the WFST generation device 100 and the speech recognition device 200) according to the embodiment. FIG. 13 is an explanatory diagram illustrating an exemplary hardware configuration of the devices according to the embodiment.

As illustrated in FIG. 13, each device according to the embodiment includes a central processing unit (CPU) 1, an operating unit 2, a display unit 3, a read only memory (ROM) 4, a random access memory (RAM) 5, a memory unit 6, a microphone 7, and a bus 8. Herein, the constituent elements are connected with each other by the bus 8.

The CPU 1 uses a predetermined area in the RAM 5 as the work area, performs various operations in cooperation with various control programs stored in advance in the ROM 4 or the memory unit 6, and comprehensively controls the operations of the constituent elements of each device according to the embodiment. Moreover, the CPU 1 implements the functions of the abovementioned functional units in cooperation with predetermined computer programs stored in advance in the ROM 4 or the memory unit 6.

The functional units of the devices can be implemented by making one or more processors such as a CPU to execute computer programs, that is, can be implemented using software; or can be implemented using hardware such as one or more integrated circuits (IC); or can be implemented using a combination of software and hardware.

The operating unit 2 is an input device such as a mouse or a keyboard that receives, as instruction signals, information input as a result of user operations; and outputs the instruction signals to the CPU 1.

The display unit 3 is configured using a display device such as a liquid crystal display (LCD) and displays a variety of information based on display signals received from the CPU 1.

The ROM 4 is used to store, in a non-rewritable manner, computer programs used in controlling the devices according to the embodiment and a variety of setting information.

The RAM 5 is a volatile memory medium such as a synchronous dynamic random access memory (SDRAM), and functions as the work area of the CPU 1. More particularly, the RAM 5 fulfils the role of a buffer in which various variables and parameters used during a WFST generation operation or a WFST-based recognition operation are stored on a temporary basis.

The memory unit 6 includes a semiconductor memory medium such as a flash memory or includes a memory medium in which information can be recorded in a magnetic or optical manner; and is used to store, in a rewritable manner, the computer programs used in controlling the devices according to the embodiment and a variety of setting information. Moreover, the memory unit 6 is used to store in advance an acoustic model, a phoneme list, a lexicon, a language model, and a variety of WFST-related information; and is used to store the WFSTs obtained during operations, the WFSTs being composed or optimized, and the processing result.

The microphone 7 receives input of the speech to be subjected to speech recognition. The input speech is then output to, for example, the front-end 201. As long as the microphone 7 is included in at least the speech recognition device 200, it serves the purpose.

Some or all of the devices according to the embodiment can be configured to operate across separate hardware units or can be configured to operate in the same hardware unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition system comprising a generation device and a recognition device wherein:

the generation device comprises:
a receiving unit that receives a model representing correspondence between one or more phonetic symbols and one or more words; and
a generating unit that generates a first finite state transducer corresponding to slow utterances based on the model, the first finite state transducer at least including, as outgoing transitions from a first state, a second transition, and a third transition,
the first state representing transition destination of a first transition which has a first phonetic symbol of a predetermined type as input symbol, wherein the predetermined type comprises a slowly utterable vowel or syllabic nasal,
the second transition that has a second phonetic symbol, which is different than a particular symbol representing part or whole of input symbol of the first transition, as input symbol, and
the third transition that has a third phonetic symbol, representing the particular symbol or silence, as input symbol, and the recognition device comprises:
a searching unit that refers to the first finite state transducer and recognizes a word corresponding to an input speech.

2. The recognition system according to claim 1, wherein the phonetic symbol is a phoneme,
the first phonetic symbol is a particular phoneme of the predetermined type, and
the particular symbol represents pronunciation of the particular phoneme that is the input symbol of the first transition.

3. The recognition system according to claim 1, wherein the phonetic symbol is a syllable including one or more phonemes,
the first phonetic symbol is a syllable in which a particular phoneme of the predetermined type is included at end, and
the particular symbol represents pronunciation of last of the particular phoneme included in the input symbol of the first transition.

4. The recognition system according to claim 1, wherein transition destination of the third transition is the first state.

5. The recognition system according to claim 4, wherein the generating unit generates the first finite state transducer in which a weight greater than zero is assigned to the third transition.

6. The recognition system according to claim 1, wherein the generating unit generates the first finite state transducer that includes, as outgoing transitions from a second state representing transition destination of the third transition,
- a fourth transition, which has either the first phonetic symbol or the third phonetic symbol as input and which represents transition to the second state, and
- a fifth transition, which has the second phonetic symbol as input.

7. The recognition system according to claim 6, wherein the generating unit generates the first finite state transducer in which a weight greater than zero is assigned to the fourth transition.

8. The recognition system according to claim 1, wherein the first phonetic symbol comprises a slowly utterable vowel.

9. The recognition system according to claim 1, further comprising a composing unit that composes
- the first finite state transducer,
- a second finite state transducer generated based on a language model, and
- a third finite state transducer generated based on an acoustic model to generate a fourth finite state transducer.

10. The recognition system according to claim 1, wherein the model is
- a lexicon, which represents correspondence between one or more phonetic symbols and one or more words, or
- a finite state transducer, which converts one or more phonetic symbols into words.

11. A generation method for generating finite state transducer, comprising:
- receiving a model representing correspondence between one or more phonetic symbols and one or more words;
- generating a first finite state transducer corresponding to slow utterances based on the model, the first finite state transducer at least including, as outgoing transitions from a first state, a second transition, and a third transition,
  - the first state representing transition destination of a first transition which has a first phonetic symbol of a predetermined type as input symbol, wherein the predetermined type comprises a slowly utterable vowel or syllabic nasal,
  - the second transition that has a second phonetic symbol, which is different than a particular symbol representing part or whole of input symbol of the first transition, as input symbol, and
  - the third transition that has a third phonetic symbol, representing the particular symbol or silence, as input symbol, and
- referring to the first finite state transducer and recognizes a word corresponding to an input speech.

* * * * *